US011869420B2

(12) United States Patent
Mou

(10) Patent No.: US 11,869,420 B2
(45) Date of Patent: Jan. 9, 2024

(54) DRIVING DEVICE AND DRIVING METHOD FOR DISPLAY PANEL, AND DISPLAY DEVICE

(71) Applicants: Chengdu BOE Optoelectronics Technology Co., Ltd., Sichuan (CN); BOE Technology Group Co., Ltd., Beijing (CN)

(72) Inventor: Xin Mou, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,144

(22) PCT Filed: Aug. 4, 2021

(86) PCT No.: PCT/CN2021/110648
§ 371 (c)(1),
(2) Date: Jun. 24, 2022

(87) PCT Pub. No.: WO2022/052685
PCT Pub. Date: Mar. 17, 2022

(65) Prior Publication Data
US 2023/0085906 A1 Mar. 23, 2023

(30) Foreign Application Priority Data
Sep. 11, 2020 (CN) ......................... 202010954142.7

(51) Int. Cl.
*G09G 3/3208* (2016.01)

(52) U.S. Cl.
CPC ....... *G09G 3/3208* (2013.01); *G09G 2310/08* (2013.01); *G09G 2320/0233* (2013.01);
(Continued)

(58) Field of Classification Search
CPC ............. G09G 3/3208; G09G 2310/08; G09G 2320/041; G09G 2320/0233;
(Continued)

(56) References Cited

U.S. PATENT DOCUMENTS 5,252,954 A * 10/1993 Nagata ................. G09G 3/3692 345/95
6,066,920 A * 5/2000 Torihara .................. H01J 61/78 315/117
(Continued)

FOREIGN PATENT DOCUMENTS

CN 101276556 A 10/2008
CN 101392875 A 3/2009
(Continued)

OTHER PUBLICATIONS

CN202010954142.7 first office action.
CN202010954142.7 second office action.
CN202010954142.7 Decision of rejection.

*Primary Examiner* — Michael J Jansen, II
(74) *Attorney, Agent, or Firm* — IPro, PLLC

(57) ABSTRACT

Provided is a driving device for a display panel. The driving device includes a temperature sensor, a timing controller, and a source driving circuit. The temperature sensor is connected to the timing controller, and is configured to sense a target temperature and output the target temperature to the timing controller, the target temperature including an operating temperature of the display panel; and the timing controller is further connected to the source driving circuit, the source driving circuit is further connected to a pixel in the display panel, and the timing controller is configured to control, based on the target temperature, the source driving circuit to output a drive signal with a target parameter to the pixel to drive the pixel to emit light; wherein target tem-
(Continued)

peratures within different temperature ranges correspond to drive signals with different target parameters.

7 Claims, 8 Drawing Sheets

(52) U.S. Cl.
CPC . *G09G 2320/041* (2013.01); *G09G 2320/045* (2013.01); *G09G 2330/045* (2013.01); *G09G 2380/10* (2013.01)

(58) Field of Classification Search
CPC ....... G09G 2320/045; G09G 2330/045; G09G 2380/10; G09G 2320/048
See application file for complete search history.

(56) References Cited

U.S. PATENT DOCUMENTS

| | | | | |
|---|---|---|---|---|
| 6,388,388 | B1 * | 5/2002 | Weindorf | H05B 41/39 315/157 |
| 8,400,391 | B2 * | 3/2013 | Schmidt | G09G 3/2081 345/102 |
| 8,558,765 | B2 * | 10/2013 | Cok | G09G 3/3225 345/82 |
| 10,551,661 | B2 * | 2/2020 | Choi | G02F 1/133382 |
| 10,914,640 | B2 * | 2/2021 | Capps | G01J 5/60 |
| 10,991,295 | B2 * | 4/2021 | Takizawa | G09G 3/2018 |
| 11,355,064 | B2 * | 6/2022 | Jeon | G09G 3/3233 |
| 11,386,820 | B2 * | 7/2022 | Li | G09G 3/006 |
| 2007/0139319 | A1 * | 6/2007 | Nishida | H05B 45/28 345/83 |
| 2008/0055209 | A1 * | 3/2008 | Cok | G09G 3/3225 345/77 |
| 2008/0055210 | A1 * | 3/2008 | Cok | G09G 3/006 345/77 |
| 2008/0238864 | A1 | 10/2008 | Fu | |
| 2009/0179848 | A1 * | 7/2009 | Schmidt | G09G 3/2081 348/739 |
| 2009/0201231 | A1 * | 8/2009 | Takahara | G09G 3/3233 345/76 |
| 2010/0156766 | A1 | 6/2010 | Levey et al. | |
| 2010/0259572 | A1 | 10/2010 | Yang et al. | |
| 2011/0074750 | A1 | 3/2011 | Leon et al. | |
| 2014/0104259 | A1 | 4/2014 | Oh et al. | |
| 2014/0312869 | A1 | 10/2014 | Zulim et al. | |
| 2018/0151127 | A1 | 5/2018 | Won et al. | |
| 2018/0158423 | A1 | 6/2018 | Kim et al. | |
| 2018/0196301 | A1 * | 7/2018 | Choi | G09G 3/3648 |
| 2020/0041349 | A1 * | 2/2020 | Capps | G09G 3/32 |
| 2021/0005157 | A1 * | 1/2021 | Takizawa | G09G 3/3622 |
| 2021/0142720 | A1 | 5/2021 | Mou et al. | |
| 2021/0241664 | A1 * | 8/2021 | Li | G09G 3/3225 |
| 2021/0319747 | A1 * | 10/2021 | Jeon | G09G 3/3233 |
| 2023/0085906 | A1 * | 3/2023 | Mou | G09G 3/3208 |

FOREIGN PATENT DOCUMENTS

| | | | |
|---|---|---|---|
| CN | 101840679 | A | 9/2010 |
| CN | 102257554 | A | 11/2011 |
| CN | 102687193 | A | 9/2012 |
| CN | 103730088 | A | 4/2014 |
| CN | 104376816 | A | 2/2015 |
| CN | 105702702 | A | 6/2016 |
| CN | 106898289 | A | 6/2017 |
| CN | 108665858 | A | 10/2018 |
| CN | 109410843 | A | 3/2019 |
| CN | 109754752 | A | 5/2019 |
| CN | 110021274 | A | 7/2019 |
| CN | 112037711 | A | 12/2020 |
| TW | 201037656 | A | 10/2010 |

* cited by examiner

DRIVING DEVICE AND DRIVING METHOD FOR DISPLAY PANEL, AND DISPLAY DEVICE

CROSS-REFERENCE TO RELATED APPLICATION

This application is a U.S. national stage of international application No. PCT/CN2021/110648, filed on Aug. 4, 2021, which claims priority to Chinese Patent Application No. 202010954142.7, filed on Sep. 11, 2020, and entitled "DRIVING DEVICE OF DISPLAY PANEL, DRIVING METHOD OF DISPLAY PANEL, AND DISPLAY DEVICE," the disclosures of which are herein incorporated by reference in their entireties.

TECHNICAL FIELD

The present disclosure relates to the fields of display technologies, and in particular to a driving device for a display panel, a driving method for the same, and a display device.

BACKGROUND

Organic light-emitting diode (OLED) display panels are widely used in the display field due to advantages thereof such as self-illumination, high response speed, and flexibility. For example, the OLED may be used in the field of in-vehicle display.

SUMMARY

The present disclosure provides a driving device for a display panel and a driving method for the same, and a display device. The technical solution is as follows.

According to one aspect, a driving device for a display panel is provided. The device includes a temperature sensor, a timing controller, and a source driving circuit; wherein the temperature sensor is connected to the timing controller, and is configured to sense a target temperature and output the target temperature to the timing controller, the target temperature comprising an operating temperature of the display panel; and the timing controller is further connected to the source driving circuit, the source driving circuit is further connected to a pixel in the display panel, and the timing controller is configured to control, based on the target temperature, the source driving circuit to output a drive signal with a target parameter to the pixel to drive the pixel to emit light;

wherein target temperatures with different temperature ranges correspond to drive signals with different target parameters.

Optionally, a first corresponding relationship between the temperature ranges and candidate parameters is stored in the timing controller; and the timing controller is configured to:

determine a target temperature range within which the target temperature falls; and determine a candidate parameter corresponding to the target temperature range as the target parameter.

Optionally, the target parameter includes at least one of a waveform of the drive signal, a duty cycle of the drive signal, and a bias voltage of the drive signal.

Optionally, the target parameter includes the waveform of the drive signal; and the first corresponding relationship includes a first temperature range, a second temperature range, a third temperature range, and a candidate waveform of the drive signal corresponding to each of the temperature ranges; wherein the candidate waveform corresponding to the first temperature range is a direct current waveform; the candidate waveform corresponding to the second temperature range is a negative bias pulse waveform; and the candidate waveform corresponding to the third temperature range is a positive bias pulse waveform; or the candidate waveform corresponding to the first temperature range is a negative bias pulse waveform; the candidate waveform corresponding to the second temperature range is a direct current waveform; and the candidate waveform corresponding to the third temperature range is a positive bias pulse waveform;

wherein an upper limit of the first temperature range is less than a lower limit of the second temperature range, and an upper limit of the second temperature range is less than a lower limit of the third temperature range.

Optionally, the waveform of the drive signal is a negative bias pulse waveform; the target parameter includes a duty cycle and a bias voltage of the negative bias pulse waveform; and the first corresponding relationship includes a first temperature range, a second temperature range, and a candidate duty cycle and a candidate bias voltage of the drive signal corresponding to each of the temperature ranges;

wherein the candidate bias voltage corresponding to the first temperature range is greater than the candidate bias voltage corresponding to the second temperature range, and the candidate duty cycle corresponding to the first temperature range is less than the candidate duty cycle corresponding to the second temperature range, an upper limit of the first temperature range being less than a lower limit of the second temperature range.

Optionally, the waveform of the drive signal is a negative bias pulse waveform and the bias voltage of the drive signal is a target negative bias voltage; the target parameter includes a duty cycle of the negative bias pulse waveform; and the first corresponding relationship includes a first temperature range, a second temperature range, and a candidate duty cycle of the drive signal corresponding to each of the temperature ranges;

wherein the candidate duty cycle corresponding to the first temperature range is less than the candidate duty cycle corresponding to the second temperature range, an upper limit of the first temperature range being less than a lower limit of the second temperature range.

Optionally, the waveform of the drive signal is a negative bias pulse waveform and the duty cycle of the drive signal is a target duty cycle; the target parameter includes a bias voltage of the negative bias pulse waveform; and the first corresponding relationship includes a first temperature range, a second temperature range, and a candidate bias voltage of the drive signal corresponding to each of the temperature ranges;

wherein the candidate bias voltage corresponding to the first temperature range is greater than the candidate bias voltage corresponding to the second temperature range, an upper limit of the first temperature range being less than a lower limit of the second temperature range.

Optionally, the timing controller is further configured to determine an operating duration of a display panel and control, based on the operating duration of the display panel and the target temperature, the source driving circuit to output the drive signal with the target parameter to the pixel;

wherein operating durations within different duration ranges at a same target temperature correspond to drive signals with different target parameters.

Optionally, a second corresponding relationship among the temperature ranges, the duration ranges, and candidate parameters is stored in the timing controller; and the timing controller is configured to:

determine a target temperature range within which the target temperature falls and a target duration range within which the operating duration falls; and determine a candidate parameter corresponding to the target temperature range and the target duration range as the target parameter.

Optionally, the target parameter includes a waveform of the drive signal; and the second corresponding relationship includes a first temperature range, a second temperature range, a first duration range, a second duration range, and a candidate waveform of the drive signal corresponding to each of the temperature ranges and each of the duration ranges;

wherein the candidate waveform corresponding to the first temperature range and the first duration range is a negative bias pulse waveform; the candidate waveform corresponding to the first temperature range and the second duration range and the candidate waveform corresponding to the second temperature range and the first duration range are direct current waveforms; and the candidate waveform corresponding to the second temperature range and the second duration range is a positive bias pulse waveform;

wherein an upper limit of the first temperature range is less than a lower limit of the second temperature range, and an upper limit of the first duration range is less than a lower limit of the second duration range.

Optionally, the target temperature further includes an ambient temperature at which the display panel is activated.

According to another aspect, a method for driving a display panel is provided. The method includes:

acquiring a target temperature, the target temperature comprising an operating temperature of the display panel; and controlling, based on the target temperature, a source driving circuit to output a drive signal with a target parameter to a pixel to drive the pixel to emit light;

wherein target temperatures within different temperature ranges correspond to drive signals with different target parameters.

According to still another aspect, a non-transitory computer-readable storage medium is provided. The computer-readable storage medium stores a computer program, wherein the computer program, when loaded and run by a processor, causes the processor to perform the method for driving the display panel as described in the above aspect.

According to still another aspect, a display device is provided. The display device includes a display panel and the driving device for the display panel as described in the above aspect, wherein the driving device for the display panel is connected to the display panel.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearly illustrating the objects, technical solutions, and advantages of embodiments of the present disclosure, the inventive concept protected by embodiments of the disclosure is described in detail hereinafter with reference to the accompanying drawings and some embodiments.

In the related art, a driving device for the OLED display panel includes a timing controller and a source driving circuit, wherein the timing controller is connected to the source driving circuit, and the source driving circuit is connected to an OLED pixel in the display panel. The timing controller is configured to control the source driving circuit to output a drive signal in terms of a fixed waveform to the OLED pixel to drive the OLED pixel to emit light.

However, the source driving circuit in the related art can only output the drive signal in terms of the fixed waveform, resulting in poor driving flexibility.

With the increase in display duration, a display panel generates Joule (a unit for measuring heat) heat, and an operating temperature of the display panel may increase, which is an inevitable physical phenomenon.

Figure 1:
FIG. 1 is a schematic diagram of a display panel according to embodiments of the present disclosure.
Figure 2:
FIG. 2 is a schematic diagram of another display panel according to embodiments of the present disclosure.

For example, a display panel displays a solid image with a brightness of 800 nits, and an ambient temperature at which the display panel currently works is a room temperature, such as 25 degrees Celsius (° C.). FIG. 1 shows the diagram of the display panel just being lit up (i.e., just starting to display), and FIG. 2 shows the diagram of the display panel upon displaying a target duration. Comparing FIG. 1 and FIG. 2, it can be seen that the temperature of the display panel gradually increases upon a period of display. For the display panel in the field of in-vehicle display, the temperature in the car in summer is relatively high, such that the temperature of the display panel may further increase. Optionally, in the case that the ambient temperature is a room temperature, the operating temperature of the display panel may increase by about 17° C. to 20° C. relative to the initial temperature (i.e., room temperature) upon working for a target duration. Correspondingly, for the display panel shown in FIG. 2, a current operating temperature may be about 42° C. In the case that the ambient temperature is high (e.g., 85° C.), the temperature of the display panel may increase even higher upon working for target duration. That is, the operating temperature of the display panel is positively correlated with the environment temperature at which the display panel works.

Furthermore, the increase in the operating temperature of the display panel may lead to the accelerated attenuation of the brightness emitted by the pixel in the display panel. Because the operating temperature of the display panel is positively correlated with the ambient temperature at which the display panel currently works, upon displaying the same image for same duration, the higher the ambient temperature is, the greater the degree of pixel brightness attenuates.

Figure 3:
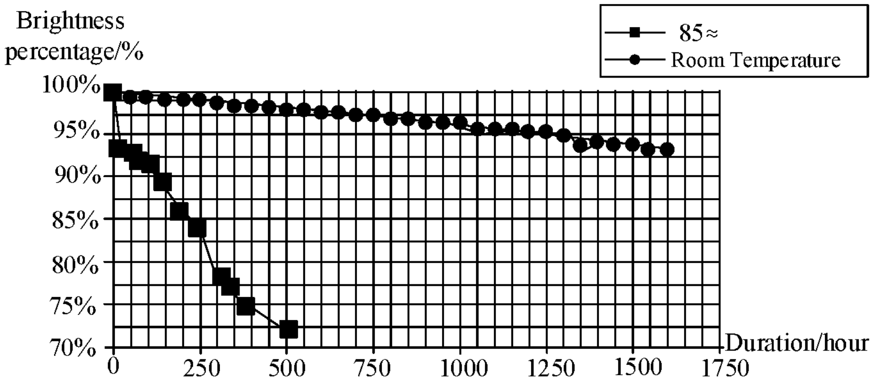
FIG. 3 is a schematic diagram of a brightness attenuation curve according to embodiments of the present disclosure.

Taking that a same image is displayed as an example, FIG. 3 shows a schematic diagram of brightness attenuation curves of a pixel at ambient temperatures of 25° C. and 85° C. respectively. The horizontal axis represents the duration in units of hours; and the vertical axis represents the brightness percentage. Referring to FIG. 3, it can be seen that upon 500 hours, the brightness of the pixel corresponding to 25° C. only attenuates to about 97.97% of the initial brightness. However, the brightness of the pixel corresponding to 85° C. directly attenuates to about 72% of the initial brightness.

Combining the above analysis, it can be seen that the ambient temperature at which the display panel works may affect the operating temperature of the display panel, thereby affecting the attenuation degree of brightness of the pixel in the display panel, resulting in short service life of the display panel. Embodiments of the present disclosure provide a driving device that can flexibly drive, based on the operating temperature of the display panel and/or ambient temperature at which the display panel works, the pixel in the display panel to emit light, effectively extending the service life of the display panel.

Figure 4:
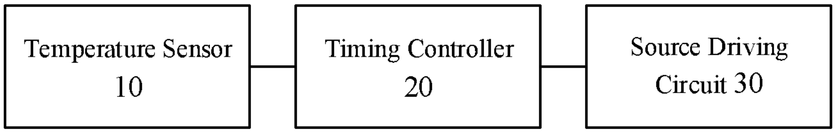
FIG. 4 is a schematic structural diagram of a driving device for a display panel according to embodiments of the present disclosure.

FIG. 4 is a schematic structural diagram of a driving device for a display panel according to embodiments of the present disclosure. As shown in FIG. 4, the device may include a temperature sensor 10, a timing controller 20, and a source driving circuit 30.

The temperature sensor 10 may be connected to the timing controller 20. The temperature sensor 10 may be configured to sense a target temperature and output the target temperature to the timing controller (TCON) 20.

Optionally, the target temperature may include the operating temperature of the display panel, i.e., the temperature of the display panel during the display process. In this embodiment of the disclosure, the temperature sensor 10 may sense the operating temperature of the display panel in real-time or every target period (i.e., periodically) and feed back the temperature to the timing controller 20.

The timing controller 20 may also be connected to the source driving circuit (specifically, source integrated circuit, source IC) 30. The source driving circuit may further be connected to a pixel in the display panel (not shown in FIG. 4). The timing controller 20 may be configured to control, based on the target temperature, the source driving circuit 30 to output a drive signal with a target parameter to the pixel to drive the pixel to emit light.

The target temperatures within different temperature ranges correspond to drive signals with different target parameters. That is, the timing controller 20 can flexibly control, based on the different operating temperatures of the display panel, the source driving circuit 30 to output different drive signals to the connected pixel.

It should be noted that the source driving circuit 30 may be connected to the pixel through a chip on film (COF) method, and the pixel may further be connected to a gate line. In the case that the gate line provides a gate drive signal with active potential, the drive signal output by the source driving circuit 30 may be further output to the pixel, making the pixel emit light.

In summary, the embodiment of the present disclosure provides a driving device for a display panel. The driving device includes a temperature sensor, a timing controller, and a source driving circuit. Because the timing controller can control, based on different operating temperatures of the display panel sensed by the temperature sensor, the source driving circuit to output drive signals with different target parameters to the connected pixel, the driving flexibility of the driving device is high.

In addition, because the attenuation degrees of brightness of the pixel are different in the case that the pixel is driven to emit light by drive signals with different target parameters, and the timing controller can control, based on the display panel operating temperature which affects the brightness attenuation of the pixel, the drive signal output by the source driving circuit to the pixel, the effect of reducing the brightness attenuation of the pixel can be achieved by flexibly controlling the drive signal output to the pixel based on the temperature, thereby extending the service life of the display panel.

Optionally, the target parameter of the drive signal in this embodiment of the disclosure may include at least one of a waveform of the drive signal, a duty cycle of the drive signal, and a bias voltage of the drive signal.

The waveform of the drive signal refers to the shape/form of the drive signal, and the waveform of the drive signal determines the driving mode of the source driving circuit 30, i.e., different waveforms correspond to different driving modes. For example, the waveform of the drive signal may include a direct current waveform, a positive bias pulse waveform, and a negative bias pulse waveform. The driving mode corresponding to the direct current waveform may be called constant current (CC) driving, the driving mode corresponding to the positive bias pulse waveform may be called pulse current (PC) driving, and the driving mode corresponding to the negative bias pulse waveform may be called alternating current (AC) driving.

Figure 5:
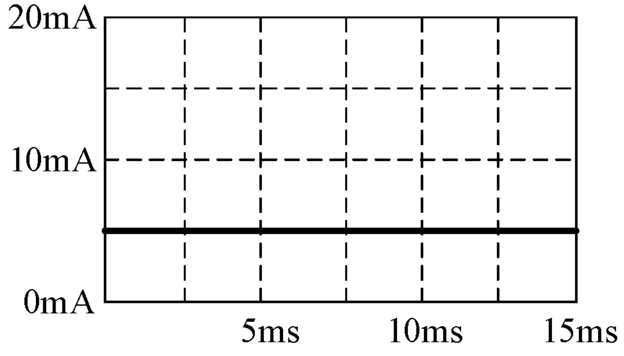
FIG. 5 is a waveform diagram of a constant current (CC) driving mode according to embodiments of the present disclosure.
Figure 6:
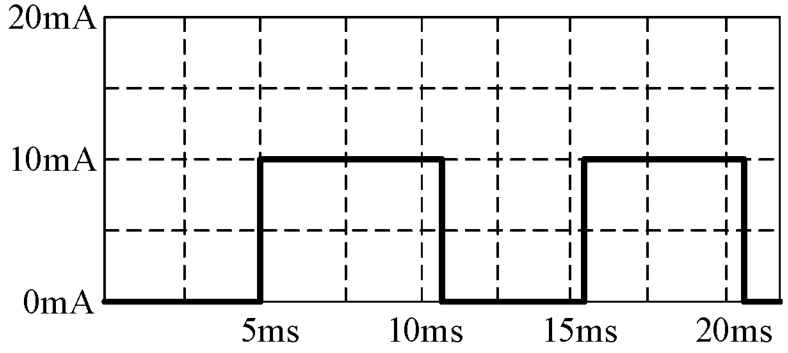
FIG. 6 is a waveform diagram of a pulse current (PC) driving mode according to embodiments of the present disclosure.
Figure 7:
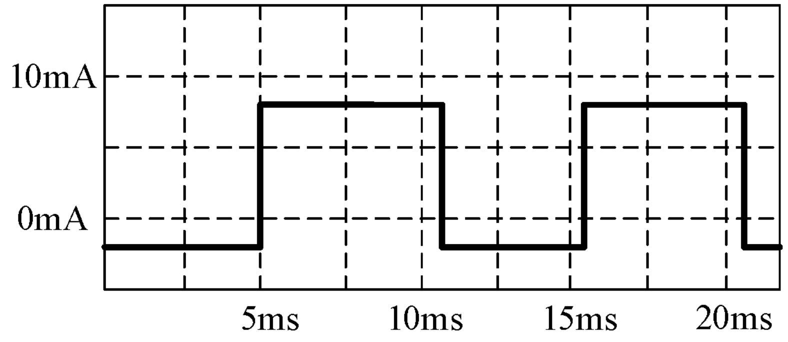
FIG. 7 is a waveform diagram of an alternating current (AC) driving mode according to embodiments of the present disclosure.
Figure 8:
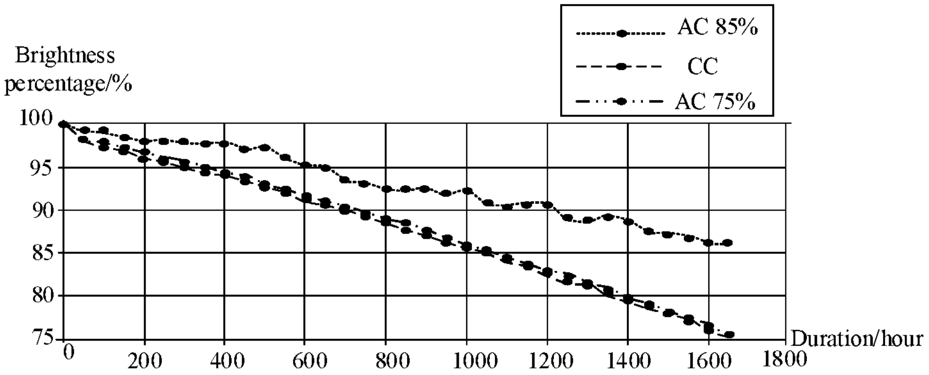
FIG. 8 is a schematic diagram of brightness attenuation curves of a white pixel under different driving modes according to embodiments of the present disclosure.

For example, FIG. 5 shows a schematic of a direct current waveform corresponding to the CC driving mode; FIG. 6 shows a schematic of a pulse waveform corresponding to the PC driving mode; and FIG. 7 shows a schematic of a pulse waveform corresponding to the AC driving mode. The horizontal axis represents time in units of milliseconds (ms); and the vertical axis represents the current in units of milliamperes (mA). Moreover, the waveforms shown in FIG. 5 to FIG. 7 just represent the driving modes schematically and do not represent the actual operating timing of the display panel.

Combining the FIG. 5 to FIG. 7, it can be seen that the CC drive means: during each frame scan, the source driving circuit 30 continuously outputs a constant drive current to the pixel, and the pixel continuously emits light. Both the PC driving and the AC driving mean: during each frame scan, the source driving circuit 30 periodically outputs a drive current to the pixel, i.e., outputs a drive current with a pulse waveform, and the pixel intermittently emits light. The difference between the PC driving and the AC driving is that under PC driving, in the case that no drive current is output (i.e., between every two pulses of active potential), the voltage loaded to two ends of the pixel is greater than or equal to zero, i.e., positive bias. However, under AC driving, in the case that no drive current is output (i.e., between every two pulses of active potential), the voltage loaded to two ends of the pixel is less than 0, i.e., negative bias.

The duty cycle of the drive signal is a percentage of a duration of the active potential in each cycle relative to an entire cycle duration. For example, for a drive signal with a direct current waveform, the duty cycle is 100%.

The bias voltage of the drive signal is a voltage of the drive signal with inactive potential. For example, for the drive signal with a negative bias pulse waveform, the bias voltage is less than 0.

Based on the above-documented embodiment, the timing controller 20 controls the target parameter of the drive signal output by the source driving circuit 30, which may also be referred to as controlling the driving mode of the source driving circuit 30. That is, the timing controller 20 provided in this embodiment of the disclosure can flexibly adjust the driving mode based on the operating temperature of the display panel.

Figure 9:
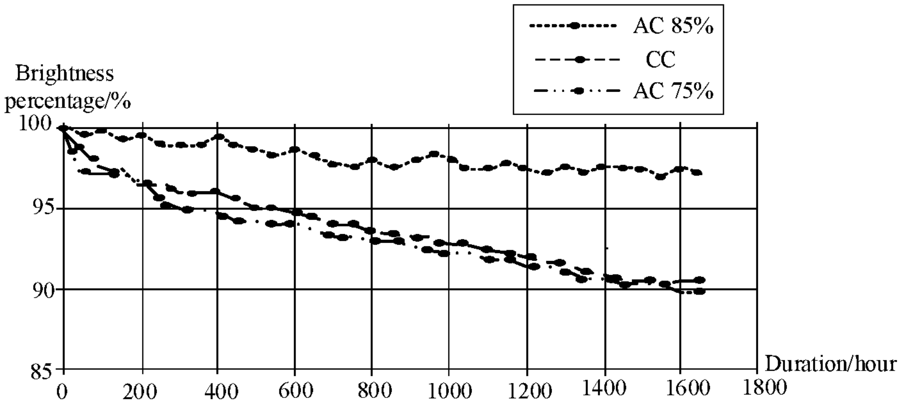
FIG. 9 is a schematic diagram of brightness attenuation curves of a red pixel under different driving modes according to embodiments of the present disclosure.
Figure 10:
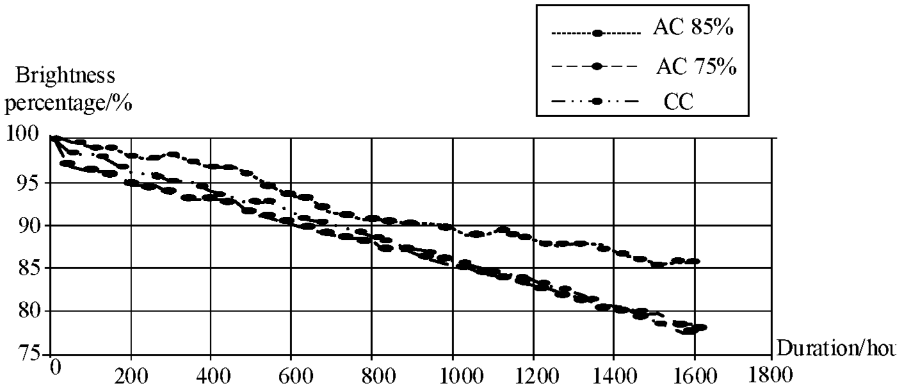
FIG. 10 is a schematic diagram of brightness attenuation curves of a green pixel under different driving modes according to embodiments of the present disclosure.
Figure 11:
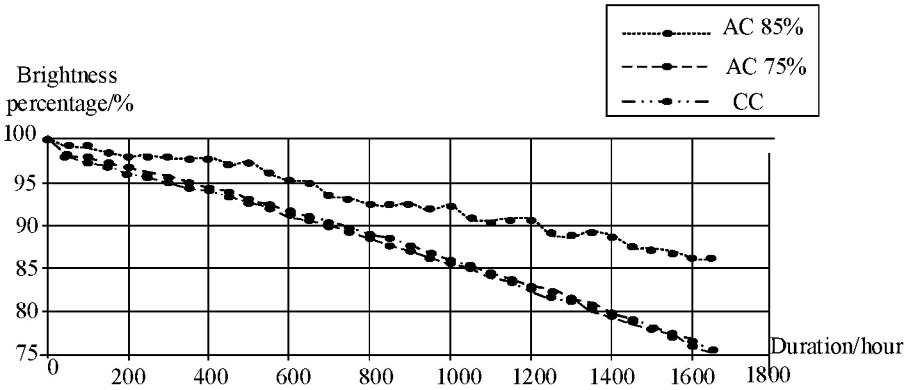
FIG. 11 is a schematic diagram of brightness attenuation curves of a blue pixel under different driving modes according to embodiments of the present disclosure.
Figure 12:
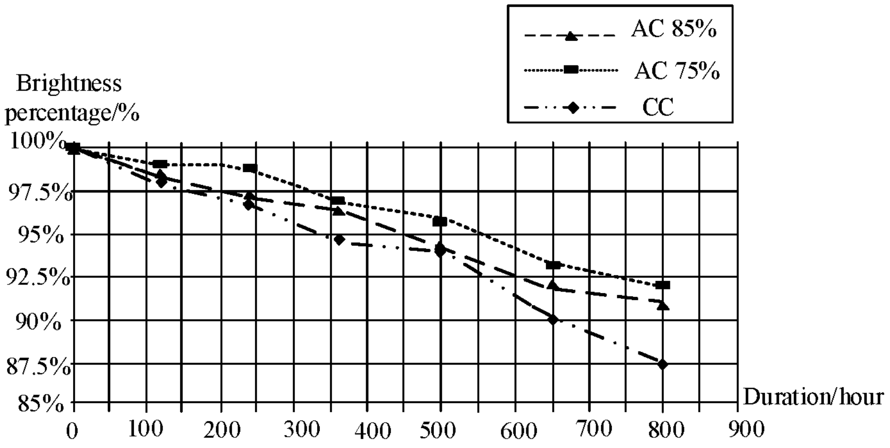
FIG. 12 is a schematic diagram of brightness attenuation curves of another white pixel under different driving modes according to embodiments of the present disclosure.
Figure 13:
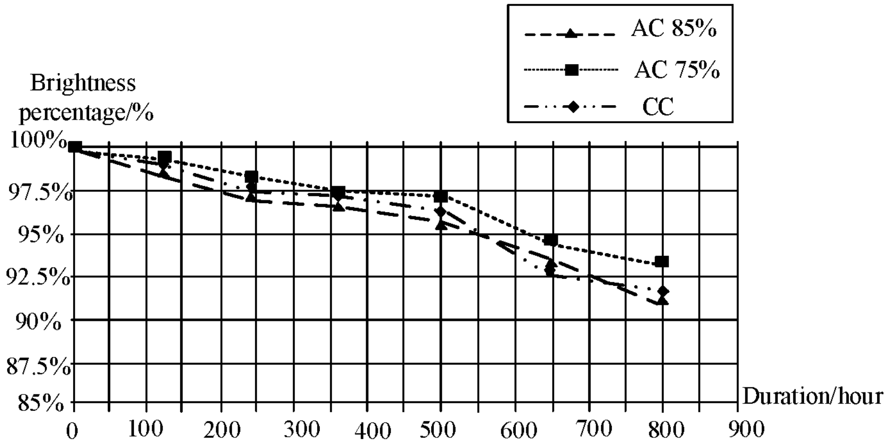
FIG. 13 is a schematic diagram of brightness attenuation curves of another red pixel under different driving modes according to embodiments of the present disclosure.
Figure 14:
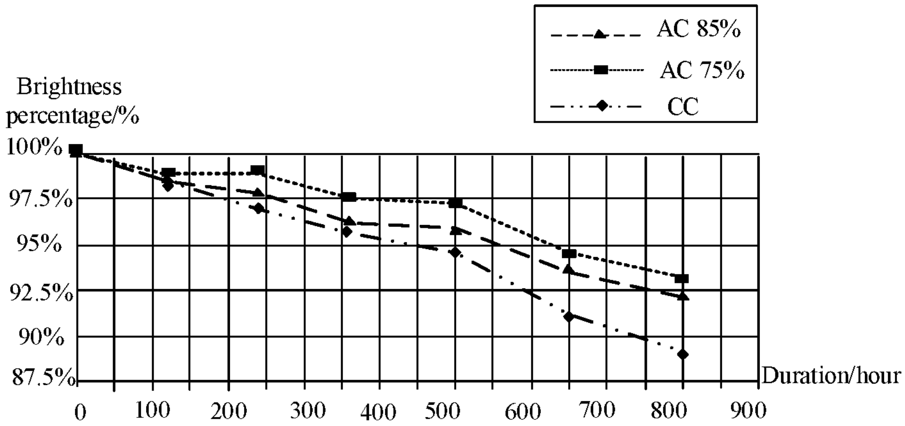
FIG. 14 is a schematic diagram of brightness attenuation curves of another green pixel under different driving modes according to embodiments of the present disclosure.
Figure 15:
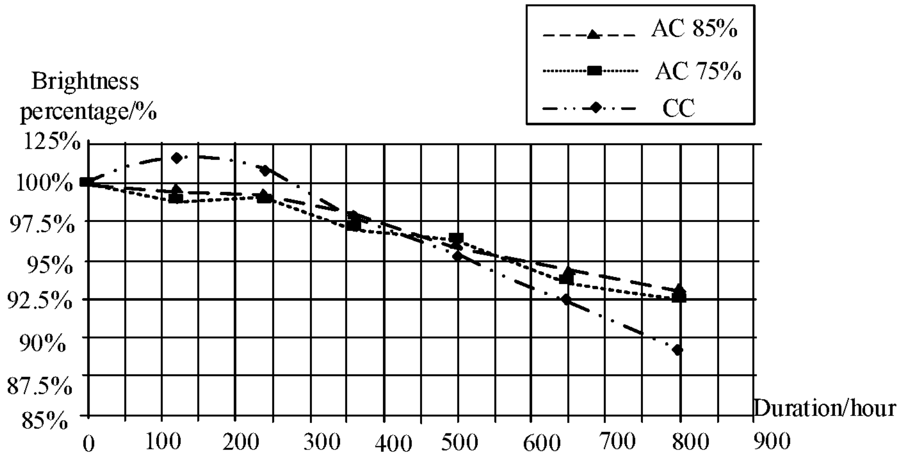
FIG. 15 is a schematic diagram of brightness attenuation curves of another blue pixel under different driving modes according to embodiments of the present disclosure.

In order to illustrate that the attenuation degrees of pixel are different in the case that the pixel is driven by drive signals with different target parameters, referring to Table 1, the pixel brightness attenuation of three pieces (pcs) flexible OLED display panels RT-1, RT-4, and RT-7 at different ambient temperatures and under different driving modes is tested, wherein the three pieces flexible OLED display panels are made on a same glass substrate at a same period and in a same batch. Combining the Table 1, during the tests, each display panel is controlled to display the WRGB images, and the brightness and gamma values of various pieces are within an error threshold (e.g., 2%), wherein the gamma values are represented by color coordinates CIE x and CIE y in the Table. FIGS. 8 to 11 show brightness attenuation curves of the white pixel W in the 3 display panels under different driving modes and at a room temperature of 25° C. FIG. 9 shows brightness attenuation curves of the red pixel R in the 3 display panels at the room temperature of 25° C. and under different driving modes. FIG. 10 shows brightness attenuation curves of the green pixel G in the 3 display panels under different driving modes and at the room temperature of 25° C. FIG. 11 shows brightness attenuation curves of the blue pixel B in the 3 display panels under different driving modes and at the room temperature of 25° C. FIG. 12 shows brightness attenuation curves of the white pixel W in the 3 display panels at a high temperature of 85° C. and under different driving modes. FIG. 13 shows brightness attenuation curves of the red pixels R in the 3 display panels under different driving modes and at the high temperature of 85° C. FIG. 14 shows brightness attenuation curves of the green pixels G in the 3 display panels at the high temperature of 85° C. and under different driving modes. FIG. 15 shows brightness attenuation curves of the blue pixel B in the 3 display panels at the high temperature of 85° C. and under different driving modes.

TABLE 1

| Number | Color | Brightness | CIE x | CIE y | Ambient temperature | Driving mode |
|---|---|---|---|---|---|---|
| RT-1 | W | 2023 | 0.307 | 0.321 | 25° C. | CC |
| | R | 486 | 0.6835 | 0.3128 | | |
| | G | 1487 | 0.291 | 0.6812 | | |
| | B | 188 | 0.1335 | 0.0666 | | |
| RT-4 | W | 2015 | 0.307 | 0.325 | 25° C. | AC, Duty cycle: |
| | R | 480 | 0.6836 | 0.3129 | | 85%, Bias |
| | G | 1468 | 0.2934 | 0.6807 | | voltage: −1 V |
| | B | 181 | 0.1337 | 0.0661 | | |
| RT-7 | W | 2027 | 0.306 | 0.323 | 25° C. | AC, Duty cycle: |
| | R | 489 | 0.6848 | 0.3126 | | 75%, Bias |
| | G | 1485 | 0.2949 | 0.6787 | | voltage: −1 V |
| | B | 189 | 0.1357 | 0.0627 | | |
| RT-1 | W | 819 | 0.308 | 0.321 | 85° C. | CC |
| | R | 236.1 | 0.6856 | 0.3118 | | |
| | G | 787.6 | 0.2936 | 0.6796 | | |
| | B | 88.2 | 0.1324 | 0.0646 | | |
| RT-4 | W | 821 | 0.308 | 0.322 | 85° C. | AC, Duty cycle: |
| | R | 236 | 0.6854 | 0.3121 | | 85%, Bias |
| | G | 787.3 | 0.2933 | 0.6791 | | voltage: −1 V |
| | B | 93.27 | 0.1332 | 0.0678 | | |
| RT-7 | W | 816 | 0.307 | 0.322 | 85° C. | AC, Duty cycle: |
| | R | 230 | 0.6849 | 0.3112 | | 75%, Bias |

TABLE 1-continued

| Number | Color | Brightness | CIE x | CIE y | Ambient temperature | Driving mode |
|---|---|---|---|---|---|---|
| | G | 785.4 | 0.2984 | 0.6755 | | voltage: −1 V |
| | B | 91.95 | 0.1327 | 0.0677 | | |

Combining the above Table 1 with FIGS. 8 to 11, it can be seen that upon 1650 hours of display, under driving modes of AC, duty cycle: 85%, and bias voltage: −1V, AC, duty cycle: 75%, and bias voltage: −1V, and CC, the brightness of the W pixel respectively attenuates to 86.11%, 75.61%, and 75.59% of the initial brightness; the brightness of the R pixels respectively attenuates to 97.27%, 89.88%, and 90.36% of the initial brightness; the brightness of the G pixels respectively attenuates to 88.30%, 82.15%, and 81.46% of the initial brightness; and the brightness of the B pixels respectively attenuates to 92.64%, 85.17%, and 87.10% of the initial brightness. As a result, it can be determined that at the ambient temperature of 25° C., the driving mode of AC, duty cycle: 85%, and bias voltage: −1V is more beneficial to delaying the brightness attenuation of the pixel.

Combining above Table 1 and FIGS. 12 to 15, it can be seen that upon 880 hours of display, under the driving modes of AC, duty cycle: 85%, and bias voltage: −1V, AC, duty cycle: 75%, and bias voltage: −1V, and CC, the brightness of the W pixels respectively attenuates to 90.9%, 92.0%, and 87.4% of the initial brightness; the brightness of the R pixels respectively attenuates to 93.5%, 95.1%, and 93.8% of the initial brightness; the brightness of the G pixels respectively attenuates to 92.2%, 93.1%, and 88.9% of the initial brightness; and the brightness of B pixels respectively attenuates to 93.1%, 92.6%, and 89.2% of the initial brightness. As a result, it can be determined that at the ambient temperature of 85° C., the driving mode of AC, duty cycle: 75%, and bias voltage: −1V is more beneficial to delaying the brightness attenuation of the pixel.

Therefore, in this embodiment of the present disclosure, the timing controller 20 can flexibly control, based on the acquired target temperature, the drive signal output by the source driving circuit 30, to delay the brightness attenuation of the pixel and extend the service life of the display panel. The target parameters corresponding to different temperatures described in the following embodiments are all target parameters that are beneficial to delaying the brightness attenuation of the pixel, that is, the service life of the display panel can be effectively extended based on the technical solutions in the following embodiments.

Optionally, the target temperature may further include the ambient temperature at which the display panel is activated. That is, in response to the display panel being activated each time, the timing controller 20 may also control, based on the ambient temperature at which the display panel works, the source driving circuit 30 to output the drive signal of the target parameter to the connected pixel. In this way, driving flexibility can be further improved and pixel brightness attenuation can be effectively delayed.

Figure 16:
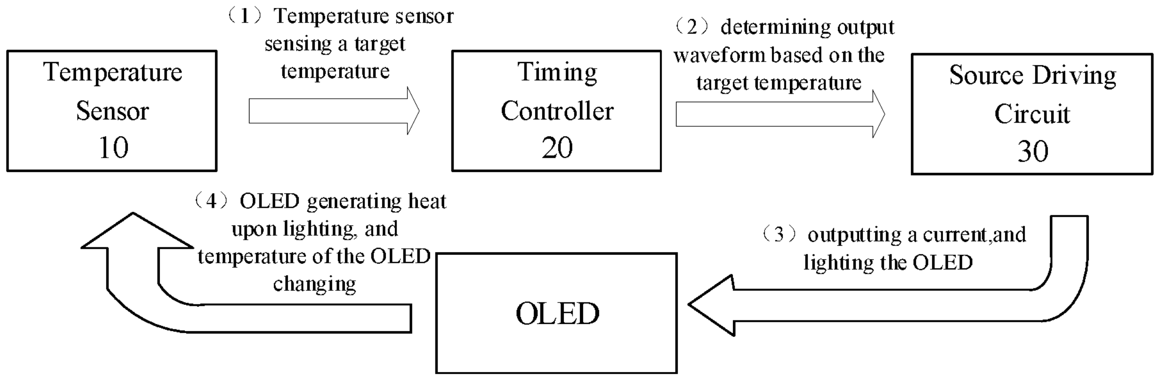
FIG. 16 is a schematic structural diagram of another driving device for a display panel according to embodiments of the present disclosure.

That is, in conjunction with FIG. 16, the entire driving process of the display panel may be summarized as the following. First, in response to the OLED display panel being activated, the temperature sensor 10 senses the target temperature (i.e., the ambient temperature at which the display panel is activated) and feeds back the target temperature to the timing controller 20. The timing controller may output, based on the temperature, a control signal to the source driving circuit 30, to make the source driving circuit 30 output the drive signal of the target parameter to the pixel. That is, the timing controller 20 may determine, based on the target temperature, the output waveform of the source driving circuit 30. At this point, the pixel can be lighted and the display panel starts to display. Then, during the operation of the display panel, the temperature sensor 10 may continue to sense the target temperature (i.e., the operating temperature of the display panel) in real-time or every target period and continue to feed back to the timing controller 20. In the case that the operating temperature of the display panel is high, the timing controller 20 may adjust the target parameter of the drive signal output to the pixel by the source driving circuit 30, i.e., control the source driving circuit 30 to output a drive signal of a new waveform to the pixel. This new waveform can facilitate delaying the pixel brightness attenuation.

Optionally, in the embodiments of the present disclosure, the timing controller 20 may store a first corresponding relationship between temperature ranges and candidate parameters. Accordingly, the timing controller 20 may be configured to determine a target temperature range within which the target temperature falls, and determine a candidate parameter corresponding to the target temperature range as the target parameter. That is, the timing controller 20 may directly determine, based on the target temperature, the target parameter from the stored first corresponding relationship.

As an optional implementation, only the waveform of the drive signal output by the source driving circuit 30 may be adjusted based on temperature, i.e., the target parameter may only include the waveform of the drive signal. Accordingly, the first corresponding relationship may include a first temperature range, a second temperature range, a third temperature range, and a candidate waveform of the drive signal corresponding to each of the temperature ranges. In addition, an upper limit of the first temperature range is less than a lower limit of the second temperature range, and an upper limit of the second temperature range is less than a lower limit of the third temperature range.

For example, referring to Tables 2 and 3, the first temperature range is shown as (0, T1), that is, in the case that the target temperature is less than T1, it is determined that the target temperature falls within the first temperature range. The second temperature range is [T1, T2), that is, in the case that the target temperature is greater than or equal to T1 and less than T2, it is determined that the target temperature falls within the second temperature range. The third temperature range is [T2, +∞), that is, in the case that the target temperature is greater than or equal to T2, it is determined that the target temperature falls within the third temperature range. That is, the relationship between T1 and T2 is: T2>T1>0.

Still referring to Table 2, it can be seen that the candidate waveform corresponding to the first temperature range may be a direct current waveform. The candidate waveform corresponding to the second temperature range may be a negative bias pulse waveform. The candidate waveform corresponding to the third temperature range may be a positive bias pulse waveform. Alternatively, still referring to Table 3, it can be seen that the candidate waveform corresponding to the first temperature range is a negative bias pulse waveform; the candidate waveform corresponding to the second temperature range is a direct current waveform; and the candidate waveform corresponding to the third temperature range is a positive bias pulse waveform.

TABLE 2

| Temperature range | R | G | B |
| --- | --- | --- | --- |
| (0, T1) | Direct current waveform | Direct current waveform | Direct current waveform |
| [T1, T2) | Negative bias pulse waveform | Negative bias pulse waveform | Negative bias pulse waveform |
| [T2, +∞) | Positive bias pulse waveform | Positive bias pulse waveform | Positive bias pulse waveform |

TABLE 3

| Temperature range | R | G | B |
| --- | --- | --- | --- |
| (0, T1) | Negative bias pulse waveform | Negative bias pulse waveform | Negative bias pulse waveform |
| [T1, T2) | Direct current waveform | Direct current waveform | Direct current waveform |
| [T2, +∞) | Positive bias pulse waveform | Positive bias pulse waveform | Positive bias pulse waveform |

Combining Table 2 and Table 3, assuming that T1 is 40° C., T2 is 80° C., and the operating temperature of the display panel acquired by the temperature sensor 10 at a specific moment is 85° C., the timing controller 20 may determine that the operating temperature of the display panel falls within the third temperature range, and then determine the candidate waveform corresponding to the third temperature range "positive bias pulse waveform" as the target parameter and control the source driving circuit 30 to output the drive signal with the positive bias pulse waveform to the pixel, to drive the pixel to emit light. It should be noted that Tables 1 and 2 show optional waveforms of drive signals corresponding to pixels of different colors (including R, G, and B).

As another optional implementation, only the duty cycle and the bias voltage of the drive signal are adjusted based on temperature without adjusting the waveform of the drive signal. For example, the waveform of the drive signal is fixed as the negative bias pulse waveform, the target parameter may include the duty cycle and the bias voltage of the negative bias pulse waveform. Accordingly, the first corresponding relationship may include a first temperature range, a second temperature range, and a candidate duty cycle and a candidate bias voltage of the drive signal corresponding to each of the temperature ranges.

The candidate bias voltage corresponding to the first temperature range is greater than the candidate bias voltage corresponding to the second temperature range, and the candidate duty cycle corresponding to the first temperature range is less than the candidate duty cycle corresponding to the second temperature range, wherein an upper limit of the first temperature range is less than a lower limit of the second temperature range.

For example, referring to Table 4, Table 4 shows a first temperature range of (0, T1) and a second temperature range of [T1, +∞), and shows that the candidate bias voltage corresponding to the first temperature range is −1V and the candidate duty cycle corresponding to the first temperature range is 75%, and the candidate bias voltage corresponding to the second temperature range is −0.5V and the candidate duty cycle corresponding to the second temperature range is 85%.

TABLE 4

| Temperature range | R | G | B |
| --- | --- | --- | --- |
| (0, T1) | Duty cycle: 75%. Bias voltage: −1 V | Duty cycle: 75%. Bias voltage: −1 V | Duty cycle: 75%. Bias voltage: −1 V |
| [T1, +∞) | Duty cycle: 85%. Bias voltage: −0.5 V | Duty cycle: 85%. Bias voltage: −0.5 V | Duty cycle: 85%. Bias voltage: −0.5 V |

Referring to Table 4, assuming that T1 is 40° C. and the operating temperature of the display panel acquired by the temperature sensor 10 at a specific moment is 60° C., the timing controller 20 may determine that the operating temperature of the display panel falls within the second temperature range, and then determine the candidate bias voltage of −0.5V and the candidate duty cycle of 85% corresponding to the second temperature range as the target parameter and control the source driving circuit 30 to output a drive signal with a negative bias pulse waveform with a bias voltage of −0.5V and a duty cycle of 85% to the pixel, to drive the pixel to emit light. It should be noted that Table 4 also shows the duties and bias voltages corresponding to different color pixels (including R, G, and B).

As yet another optional implementation, only the duty cycle of the drive signal is adjusted based on temperature, and the waveform and the bias voltage of the drive signal are not adjusted. Taking that the waveform of the drive signal is the negative bias pulse waveform and the bias voltage of the drive signal is a target negative bias voltage as an example, the target parameter may include a duty cycle of the negative bias pulse waveform with the target negative bias voltage. Accordingly, the first corresponding relationship may include a first temperature range, a second temperature range, and a candidate duty cycle of the drive signal corresponding to each of the temperature ranges.

The candidate duty cycle corresponding to the first temperature range is smaller than the candidate duty cycle corresponding to the second temperature range, and an upper limit of the first temperature range is smaller than a lower limit of the second temperature range.

For example, referring to Table 5, Table 5 shows that the first temperature range is (0, T1) and the second temperature range is [T1, +∞), the bias voltage of the drive signal corresponding to each of the temperature ranges is the target negative bias voltage of −1V, the candidate duty cycle corresponding to the first temperature range is 75%, and the candidate duty cycle corresponding to the second temperature range is 85%.

TABLE 5

| Temperature range | R | G | B |
| --- | --- | --- | --- |
| (0, T1) | Duty cycle: 85%. Bias voltage: −1 V | Duty cycle: 85%. Bias voltage: −1 V | Duty cycle: 85%. Bias voltage: −1 V |

TABLE 5-continued

| Temperature range | R | G | B |
|---|---|---|---|
| [T1, +∞) | Duty cycle: 75%. Bias voltage: −1 V | Duty cycle: 75%. Bias voltage: −1 V | Duty cycle: 75%. Bias voltage: −1 V |

Referring to Table 5, assuming that T1 is 40° C. and the operating temperature of the display panel acquired by the temperature sensor 10 at a specific moment is 20° C., the timing controller 20 may determine that the operating temperature of the display panel falls within the first temperature range, and then determine the candidate duty cycle of 85% corresponding to the first temperature range as the target parameter and control the source driving circuit 30 to output a drive signal with a negative bias pulse waveform of a bias voltage of −1V and a duty cycle of 85% to the pixel, to drive the pixel to emit light. It should be noted that Table 5 also shows the duties and bias voltages corresponding to different color pixels (including R, G, and B).

As yet another optional implementation, only the bias voltage of the drive signal is adjusted based on the temperature without adjusting the waveform and the duty cycle of the drive signal. Taking that the waveform of the drive signal is fixed as the negative bias pulse waveform and the duty cycle of the drive signal is a target duty cycle as an example, the target parameter may include a bias voltage of a pulse waveform of the target duty cycle. Accordingly, the first corresponding relationship may include a first temperature range, a second temperature range, and a candidate bias voltage of the drive signal corresponding to each of the temperature ranges.

The candidate bias voltage corresponding to the first temperature range is greater than the candidate bias voltage corresponding to the second temperature range, and an upper limit of the first temperature range is less than a lower limit of the second temperature range.

For example, referring to Table 6, Table 6 shows a first temperature range of (0, T1) and a second temperature range of [T1, +∞), and shows that the duty cycle of the drive signal corresponding to each of the temperature ranges is the target duty cycle of 75%, the candidate bias voltage corresponding to the first temperature range is −1V, and the candidate bias voltage corresponding to the second temperature range is −0.5V.

TABLE 6

| Temperature range | R | G | B |
|---|---|---|---|
| (0, T1) | Duty cycle: 75%. Bias voltage: −1 V | Duty cycle: 75%. Bias voltage: −1 V | Duty cycle: 75%. Bias voltage: −1 V |
| [T1, +∞) | Duty cycle: 75%. Bias voltage: −0.5 V | Duty cycle: 75%. Bias voltage: −0.5 V | Duty cycle: 75%. Bias voltage: −0.5 V |

Referring to Table 6, assuming that T1 is 40° C. and the operating temperature of the display panel acquired by the temperature sensor 10 at a specific moment is 85° C., the timing controller 20 may determine that the operating temperature of the display panel falls within the second temperature range, and then determine the candidate bias voltage of −0.5V corresponding to the second temperature range as the target parameter and control the source driving circuit 30 to output a drive signal with the negative bias pulse waveform of the bias voltage of −0.5V and the duty cycle of 75% to the pixel, to drive the pixel to emit light. It should be noted that Table 6 also shows duties and bias voltages corresponding to different color pixels (including R, G, and B).

It should be noted that the operating temperature of the display panel sensed by the temperature sensor 10 may be affected by other factors (e.g., ambient temperature), therefore the timing controller 20 may also store a temperature error. Upon acquiring the temperature fed back by the temperature sensor 10, the timing controller 20 may further determine the target temperature based on the pre-stored temperature error and the received temperature. In this way, the reliability of the acquired target temperature is ensured, which in turn ensures the accuracy of the drive signal finally output to the pixel by the source driving circuit 30.

In addition, because the brightness attenuation of the pixel varies with the display duration of the display panel, in this embodiment of the present disclosure, the timing controller 20 may further be configured to determine an operating duration of the display panel, and control, based on the operating duration of the display panel and the target temperature, the source driving circuit 30 to output the drive signal with the target parameter to the pixel. At a same target temperature, the operating durations within different duration ranges correspond to drive signals with different target parameters. In this way, the driving flexibility can be further improved and the service life of the display panel can be further extended.

Optionally, as documented in the above embodiments, a second corresponding relationship among the temperature ranges, the duration ranges, and candidate parameters may be stored in the timing controller 20. Accordingly, the timing controller 20 may be configured to determine a target temperature range within which the target temperature falls and a target duration range within which the operating duration falls, and determine the candidate parameter corresponding to the target temperature range and the target duration range as the target parameter.

Assuming that the target parameter only includes the waveform of the drive signal, accordingly, the second corresponding relationship may include a first temperature range, a second temperature range, a first duration range, a second duration range, and a candidate waveform of the drive signal corresponding to each of the temperature ranges and each of the duration ranges, wherein an upper limit of the first temperature range is less than a lower limit of the second temperature range, and an upper limit of the first duration range is less than a lower limit of the second duration range.

For example, referring to Table 7, Table 7 shows a first temperature range of (0, T1) and a second temperature range of [T1, +∞). In addition, the first duration range is shown as (0, t1), that is, in the case that the operating duration is less than t1, it is determined that the operating duration falls within the first duration range. The second duration range is [t1, +∞), that is, in the case that the operating duration is greater than or equal to t1, it is determined that the operating duration falls within the second duration range. In addition, the T1 corresponding to the second temperature range and the T1 corresponding to the first temperature range may be the same or different.

Still referring to Table 7, the candidate waveform shown in Table 7 corresponding to the first temperature range and the first duration range may be a negative bias pulse waveform, and both the candidate waveform corresponding to the first temperature range and the second duration range and the candidate waveform corresponding to the second temperature range and the first duration range may be direct current waveforms. The candidate waveform corresponding to the second temperature range and the second duration range may be a positive bias pulse waveform.

TABLE 7

| Temperature range | Duration | R | G | B |
|---|---|---|---|---|
| (0, T1) | (0, t1) | Negative bias pulse waveform | Negative bias pulse waveform | Negative bias pulse waveform |
| | [t1, +∞) | Direct current waveform | Direct current waveform | Direct current waveform |
| [T1, +∞) | (0, t1) | Direct current waveform | Direct current waveform | Direct current waveform |
| | [t1, +∞) | Positive bias pulse waveform | Positive bias pulse waveform | Positive bias pulse waveform |

Referring to Table 7, assuming that T1 is 40° C., t1 is 500 hours, and at the 600th hour, the operating temperature of the display panel acquired by the temperature sensor 10 is 85° C., the timing controller 20 may determine that the operating temperature of the display panel falls within the second temperature range and the operating duration falls within the second duration range, and then determine the candidate waveform "positive bias pulse waveform" corresponding to the second temperature range and the second duration range as the target parameter and control the source driving circuit 30 to output the drive signal with the positive bias pulse waveform to the pixel, to drive the pixels to emit light. Table 7 also shows the waveforms corresponding to different color pixels (including R, G, and B).

Figure 17:
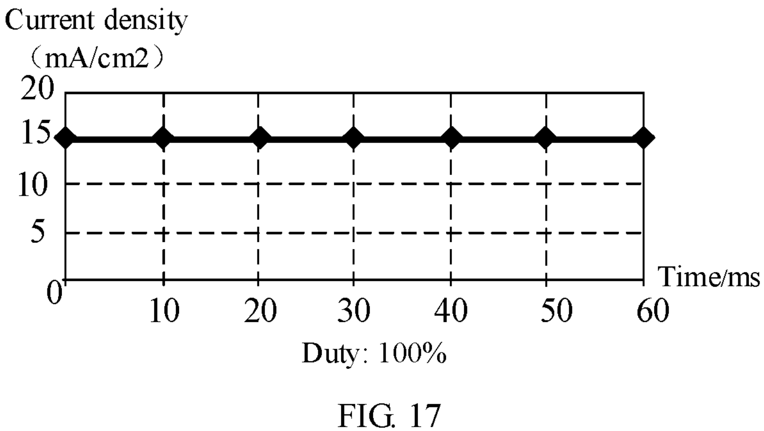
FIG. 17 is a schematic diagram of a waveform of a drive signal according to embodiments of the present disclosure.
Figure 18:
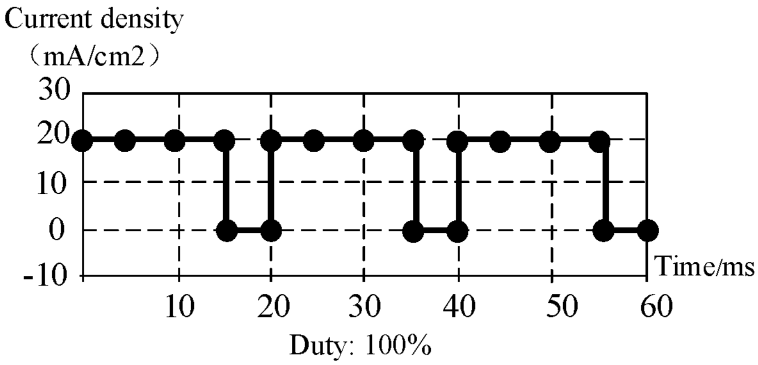
FIG. 18 is a schematic diagram of a waveform of another drive signal according to embodiments of the present disclosure.

As an example, FIG. 17 and FIG. 18 show the schematic diagrams of the drive signals with two different types of target parameters output by the source driving circuit 30 under the control of the timing controller 20 in the case that the target temperature falls respectively within the first temperature range of (0, T1) and the second temperature range of [T1, +∞). The horizontal axis represents the time in units of milliseconds, and the vertical axis represents the current density in units of milliamperes per square centimeter ($mA/cm^2$).

Referring to FIG. 17, the target parameter of the drive signal shown in FIG. 17 is the direct current waveform. Referring to FIG. 18, the target parameter of the drive signal shown in FIG. 18 includes the negative bias pulse waveform and the duty cycle of 75%. In conjunction with the above-documented embodiment, it can be seen that in the case that the target temperature is greater than T1, relative to continuing to control the source driving circuit 30 to output the drive signal shown in FIG. 17 to the pixel, controlling the source driving circuit 30 to output the drive signal shown in FIG. 18 to the pixel may result in a smaller attenuation rate and attenuation amplitude of brightness of the pixel. In this way, the effect of delaying, based on the temperature, the brightness attenuation of the pixel is achieved, and the service life of the display panel is effectively extended.

It should be noted that the above Tables 2 to 7 only schematically show one type of the target parameter corresponding to each of the different temperature ranges, and the waveform, duty cycle, and bias voltage of the drive signal are not limited in embodiments of the present disclosure. Optionally, the negative bias voltage of the drive signal may be adjusted in the range of −0.1V to −10V, as long as the negative bias voltage is not greater than a reverse breakdown voltage of the pixel. The duty cycle of the drive signal may be adjusted in the range of 1% to 99.99%. In addition, the frequency of the drive signal may be adjusted in the range of 1 Hertz (Hz) to 360 Hz.

In summary, the embodiments of the present disclosure provide a driving device for a display panel. The device includes a temperature sensor, a timing controller, and a source driving circuit. Because the timing controller can control, based on the different display panel operating temperatures sensed by the temperature sensor, the source driving circuit to output drive signals with different target parameters to the connected pixel, the driving flexibility of the driving device is high.

Figure 19:
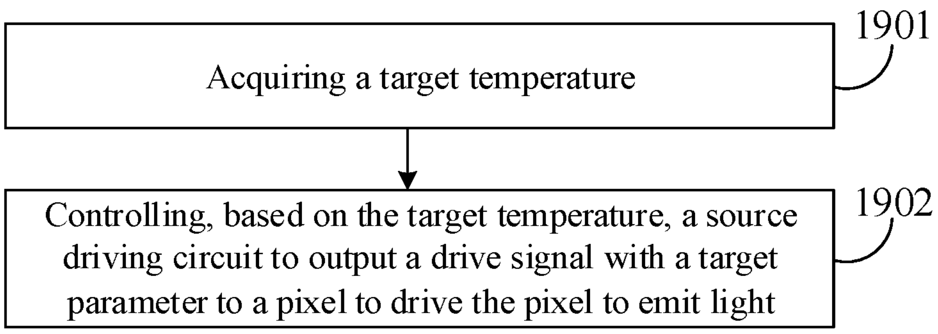
FIG. 19 is a flow chart of a method for driving a display panel according to embodiments of the present disclosure.

FIG. 19 is a flowchart of a method for driving a display panel according to embodiments of the present disclosure. The method is applicable to the timing controller 20 shown in FIG. 1. As shown in FIG. 19, the method may include the following processes.

Process 1901: the target temperature is acquired.

Optionally, the target temperature may include the operating temperature of the display panel.

Process 1902: the source driving circuit is controlled, based on the target temperature, to output a drive signal of a target parameter to a pixel to drive the pixel to emit light.

The target temperatures within different temperature ranges correspond to drive signals with different target parameters.

In summary, the embodiment of the present disclosure provides a method for driving a display panel. In the method, the timing controller can control, based on different display panel operating temperatures sensed by the temperature sensor, the source driving circuit to output drive signals with different target parameters to the connected pixel, therefore the driving flexibility of the method is high.

It should be noted that for the corresponding optional implementations for processes 1901 and 1902, reference may be made to the above device embodiment, and the descriptions are not repeated in the method embodiment.

Optionally, the embodiments of the present disclosure further provide a non-transitory computer-readable storage medium storing a computer program. The computer program, when loaded and run by a processor, causes the processor to perform the method for driving the display panel as shown in FIG. 19.

Figure 20:
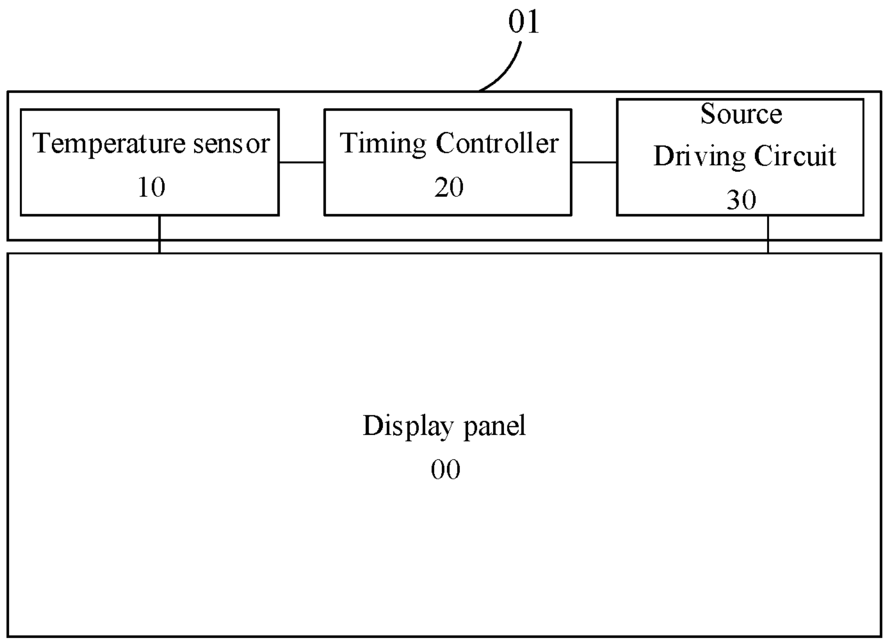
FIG. 20 is a schematic structural diagram of a display device according to embodiments of the present disclosure.

Optionally, FIG. 20 is a schematic structural diagram of a display device according to embodiments of the present disclosure. As shown in FIG. 20, the display device may include a display panel 00 and the driving device 01 for the display panel as shown in FIG. 4, wherein the driving device 01 for the display panel may be connected to the display panel 00 and drive the display panel 00 to display.

Optionally, referring to FIG. 20, the temperature sensor 10 and the source driving circuit 30 in the driving device 01 for the display panel are directly connected to the display panel 00 separately. The display panel 00 may be an in-vehicle display panel.

Optionally, the display device may be an OLED device, a cell phone, a tablet, a television, a monitor, a laptop, a navigator, or any other product or component with a display function.

It should be understood that the "and/or" in the specification indicates that there may be three kinds of relationships, for example, A and/or B may include three cases, that is, only A exists, both A and B exist, and only B exists. The character "I" generally indicates an "or" relationship between the associated objects in front of the character and behind the character.

The foregoing are only optional embodiments of the present disclosure and are not intended to limit the present disclosure, and any modifications, equivalent substitutions, or improvements made within the concept and principle of the present disclosure are within the scope of protection of the present disclosure.

What is claimed is:

1. A driving device for a display panel, comprising: a temperature sensor, a timing controller, and a source driving circuit; wherein the temperature sensor is connected to the timing controller, and is configured to sense a target temperature and output the target temperature to the timing controller, the target temperature comprising an operating temperature of the display panel;

the timing controller is further connected to the source driving circuit, the source driving circuit is further connected to a pixel in the display panel, and the timing controller is configured to control, based on the target temperature, the source driving circuit to output a drive signal with a target parameter to the pixel to drive the pixel to emit light; wherein target temperatures within different temperature ranges correspond to drive signals with different target parameters; and a first corresponding relationship between the temperature ranges and candidate parameters is stored in the timing controller; and the timing controller is configured to: determine a target temperature range within which the target temperature falls; and determine a candidate parameter corresponding to the target temperature range as the target parameter; wherein there is at least one of the following:

the target parameter comprises the waveform of the drive signal; and the first corresponding relationship comprises a first temperature range, a second temperature range, a third temperature range, and a candidate waveform of the drive signal corresponding to each of the temperature ranges; wherein the candidate waveform corresponding to the first temperature range is a direct current waveform; the candidate waveform corresponding to the second temperature range is a negative bias pulse waveform; and the candidate waveform corresponding to the third temperature range is a positive bias pulse waveform; or the candidate waveform corresponding to the first temperature range is a negative bias pulse waveform; the candidate waveform corresponding to the second temperature range is a direct current waveform; and the candidate waveform corresponding to the third temperature range is a positive bias pulse waveform;

wherein an upper limit of the first temperature range is less than a lower limit of the second temperature range, and an upper limit of the second temperature range is less than a lower limit of the third temperature range; or the waveform of the drive signal is a negative bias pulse waveform; the target parameter comprises a duty cycle and a bias voltage of the negative bias pulse waveform; and the first corresponding relationship comprises a first temperature range, a second temperature range, and a candidate duty cycle and a candidate bias voltage of the drive signal corresponding to each of the temperature ranges;

wherein the candidate bias voltage corresponding to the first temperature range is greater than the candidate bias voltage corresponding to the second temperature range, and the candidate duty cycle corresponding to the first temperature range is less than the candidate duty cycle corresponding to the second temperature range, an upper limit of the first temperature range being less than a lower limit of the second temperature range; or the waveform of the drive signal is a negative bias pulse waveform and the bias voltage of the drive signal is a target negative bias voltage; the target parameter comprises a duty cycle of the negative bias pulse waveform; and the first corresponding relationship comprises a first temperature range, a second temperature range, and a candidate duty cycle of the drive signal corresponding to each of the temperature ranges;

wherein the candidate duty cycle corresponding to the first temperature range is less than the candidate duty cycle corresponding to the second temperature range, an upper limit of the first temperature range being less than a lower limit of the second temperature range; or the waveform of the drive signal is a negative bias pulse waveform and the duty cycle of the drive signal is a target duty cycle; the target parameter comprises a bias voltage of the negative bias pulse waveform; and the first corresponding relationship comprises a first temperature range, a second temperature range, and a candidate bias voltage of the drive signal corresponding to each of the temperature ranges;

wherein the candidate bias voltage corresponding to the first temperature range is greater than the candidate bias voltage corresponding to the second temperature range, an upper limit of the first temperature range being less than a lower limit of the second temperature range.

2. The driving device according to claim 1, wherein the target temperature further comprises an ambient temperature at which the display panel is activated.

3. A method for driving a display panel, operated by the driving device for a display panel according to claim 1, wherein the method comprises:

acquiring a target temperature, the target temperature comprising an operating temperature of the display panel; and controlling, based on the target temperature, a source driving circuit to output a drive signal with a target parameter to a pixel to drive the pixel to emit light;

wherein target temperatures within different temperature ranges correspond to drive signals with different target parameters.

4. A non-transitory computer-readable storage medium, storing a computer program, wherein the computer program, when loaded and run by a processor, causes the processor to perform the method for driving the display panel as defined in claim 3.

5. A driving device for a display panel, comprising: a temperature sensor, a timing controller, and a source driving circuit; wherein the temperature sensor is connected to the timing controller, and is configured to sense a target temperature and output the target temperature to the timing controller, the target temperature comprising an operating temperature of the display panel;

the timing controller is further connected to the source driving circuit, the source driving circuit is further connected to a pixel in the display panel, and the timing controller is configured to control, based on the target temperature, the source driving circuit to output a drive signal with a target parameter to the pixel to drive the pixel to emit light; wherein target temperatures within different temperature ranges correspond to drive signals with different target parameters; and the timing controller is further configured to determine an operating duration of the display panel and control, based on the operating duration of the display panel and the target temperature, the source driving circuit to output the drive signal with the target parameter to the pixel; wherein operating durations within different duration ranges at a same target temperature correspond to drive signals with different target parameters;

wherein a second corresponding relationship among the temperature ranges, the duration ranges, and candidate parameters is stored in the timing controller; and the timing controller is configured to: determine a target temperature range within which the target temperature falls and a target duration range within which the operating duration falls; and determine a candidate parameter corresponding to the target temperature range and the target duration range as the target parameter;

wherein the target parameter comprises a waveform of the drive signal; and the second corresponding relationship comprises a first temperature range, a second temperature range, a first duration range, a second duration range, and a candidate waveform of the drive signal corresponding to each of the temperature ranges and each of the duration ranges;

wherein the candidate waveform corresponding to the first temperature range and the first duration range is a negative bias pulse waveform; the candidate waveform corresponding to the first temperature range and the second duration range and the candidate waveform corresponding to the second temperature range and the first duration range are direct current waveforms; and the candidate waveform corresponding to the second temperature range and the second duration range is a positive bias pulse waveform;

wherein an upper limit of the first temperature range is less than a lower limit of the second temperature range, and an upper limit of the first duration range is less than a lower limit of the second duration range.

6. The driving device according to claim 5, wherein a first corresponding relationship between the temperature ranges and the candidate parameters is stored in the timing controller; and the timing controller is configured to determine the target temperature range within which the target temperature falls and determine a candidate parameter corresponding to the target temperature range as the target parameter; wherein the target parameter comprises at least one of the waveform of the drive signal, a duty cycle of the drive signal, and a bias voltage of the drive signal; wherein there is at least one of:

the target parameter comprises the waveform of the drive signal; and the first corresponding relationship comprises a first temperature range, a second temperature range, a third temperature range, and a candidate waveform of the drive signal corresponding to each of the temperature ranges; wherein the candidate waveform corresponding to the first temperature range is a direct current waveform; the candidate waveform corresponding to the second temperature range is a negative bias pulse waveform; and the candidate waveform corresponding to the third temperature range is a positive bias pulse waveform; or the candidate waveform corresponding to the first temperature range is a negative bias pulse waveform; the candidate waveform corresponding to the second temperature range is a direct current waveform; and the candidate waveform corresponding to the third temperature range is a positive bias pulse waveform; an upper limit of the first temperature range being less than a lower limit of the second temperature range, and an upper limit of the second temperature range being less than a lower limit of the third temperature;

the waveform of the drive signal is a negative bias pulse waveform; the target parameter comprises a duty cycle and a bias voltage of the negative bias pulse waveform; and the first corresponding relationship comprises a first temperature range, a second temperature range, and a candidate duty cycle and a candidate bias voltage of the drive signal corresponding to each of the temperature ranges; wherein the candidate bias voltage corresponding to the first temperature range is greater than the candidate bias voltage corresponding to the second temperature range, and the candidate duty cycle corresponding to the first temperature range is less than the candidate duty cycle corresponding to the second temperature range, an upper limit of the first temperature range being less than a lower limit of the second temperature range;

the waveform of the drive signal is a negative bias pulse waveform, and the bias voltage of the drive signal is a target negative bias voltage; the target parameter comprises a duty cycle of the negative bias pulse waveform; and the first corresponding relationship comprises a first temperature range, a second temperature range, and a candidate duty cycle of the drive signal corresponding to each of the temperature ranges; wherein the candidate duty cycle corresponding to the first temperature range is less than the candidate duty cycle corresponding to the second temperature range, an upper limit of the first temperature range being less than a lower limit of the second temperature range; or the waveform of the drive signal is a negative bias pulse waveform, and the duty cycle of the drive signal is a target duty cycle; the target parameter comprises a bias voltage of the negative bias pulse waveform; and the first corresponding relationship comprises a first temperature range, a second temperature range, and a candidate bias voltage of the drive signal corresponding to each of the temperature ranges; wherein the candidate bias voltage corresponding to the first temperature range is greater than the candidate bias voltage corresponding to the second temperature range, an upper limit of the first temperature range being less than a lower limit of the second temperature range;

and wherein the target temperature further comprises an ambient temperature at which the display panel is activated.

7. A display device, comprising: a display panel and a driving device for the display panel, wherein the driving device for the display panel is connected to the display panel, and the driving device comprises: a temperature sensor, a timing controller, and a source driving circuit; wherein the temperature sensor is connected to the timing controller, and is configured to sense a target temperature and output the target temperature to the timing controller, the target temperature comprising an operating temperature of the display panel;

the timing controller is further connected to the source driving circuit, the source driving circuit is further connected to a pixel in the display panel, and the timing controller is configured to control, based on the target temperature, the source driving circuit to output a drive signal with a target parameter to the pixel to drive the pixel to emit light; wherein target temperatures within different temperature ranges correspond to drive signals with different target parameters; and a first corresponding relationship between the temperature ranges and candidate parameters is stored in the timing controller; and the timing controller is configured to: determine a target temperature range within which the target temperature falls; and determine a candidate parameter corresponding to the target temperature range as the target parameter; wherein there is at least one of the following:

the target parameter comprises the waveform of the drive signal; and the first corresponding relationship comprises a first temperature range, a second temperature range, a third temperature range, and a candidate waveform of the drive signal corresponding to each of the temperature ranges; wherein the candidate waveform corresponding to the first temperature range is a direct current waveform; the candidate waveform corresponding to the second temperature range is a negative bias pulse waveform; and the candidate waveform corresponding to the third temperature range is a positive bias pulse waveform; or the candidate waveform corresponding to the first temperature range is a negative bias pulse waveform; the candidate waveform corresponding to the second temperature range is a direct current waveform; and the candidate waveform corresponding to the third temperature range is a positive bias pulse waveform;

wherein an upper limit of the first temperature range is less than a lower limit of the second temperature range, and an upper limit of the second temperature range is less than a lower limit of the third temperature range; or the waveform of the drive signal is a negative bias pulse waveform; the target parameter comprises a duty cycle and a bias voltage of the negative bias pulse waveform; and the first corresponding relationship comprises a first temperature range, a second temperature range, and a candidate duty cycle and a candidate bias voltage of the drive signal corresponding to each of the temperature ranges;

wherein the candidate bias voltage corresponding to the first temperature range is greater than the candidate bias voltage corresponding to the second temperature range, and the candidate duty cycle corresponding to the first temperature range is less than the candidate duty cycle corresponding to the second temperature range, an upper limit of the first temperature range being less than a lower limit of the second temperature range; or the waveform of the drive signal is a negative bias pulse waveform and the bias voltage of the drive signal is a target negative bias voltage; the target parameter comprises a duty cycle of the negative bias pulse waveform; and the first corresponding relationship comprises a first temperature range, a second temperature range, and a candidate duty cycle of the drive signal corresponding to each of the temperature ranges;

wherein the candidate duty cycle corresponding to the first temperature range is less than the candidate duty cycle corresponding to the second temperature range, an upper limit of the first temperature range being less than a lower limit of the second temperature range; or the waveform of the drive signal is a negative bias pulse waveform and the duty cycle of the drive signal is a target duty cycle; the target parameter comprises a bias voltage of the negative bias pulse waveform; and the first corresponding relationship comprises a first temperature range, a second temperature range, and a candidate bias voltage of the drive signal corresponding to each of the temperature ranges;

wherein the candidate bias voltage corresponding to the first temperature range is greater than the candidate bias voltage corresponding to the second temperature range, an upper limit of the first temperature range being less than a lower limit of the second temperature range.

* * * * *